United States Patent [19]
Prostko et al.

(10) Patent No.: US 11,062,541 B2
(45) Date of Patent: Jul. 13, 2021

(54) AUTOMATED ARCHITECTURAL SPECIFICATION GENERATION AND HARDWARE IDENTIFICATION

(71) Applicant: Schlage Lock Company LLC, Carmel, IN (US)

(72) Inventors: Robert S. Prostko, Carmel, IN (US); Robert C. Martens, Carmel, IN (US); Nick Heitzman, Indianapolis, IN (US); Kristin Day, Carmel, IN (US); Martin Madsen, Fishers, IN (US); Jason Kornaker, Fayetteville, OH (US); Daniel Langenberg, Zionsville, IN (US); Brian C. Eickhoff, Danville, IN (US); Scott Baxter, Carmel, IN (US); Joseph W. Baumgarte, Carmel, IN (US); Benjamin Hopkins, Zionsville, IN (US); Steve J. Kottlowski, Noblesville, IN (US); Jacob Scheib, Noblesville, IN (US)

(73) Assignee: Schlage Lock Company LLC, Carmel, IN (US)

( * ) Notice: Subject to any disclaimer, the term of this patent is extended or adjusted under 35 U.S.C. 154(b) by 45 days.

(21) Appl. No.: 16/425,777

(22) Filed: May 29, 2019

(65) Prior Publication Data
US 2019/0371102 A1 Dec. 5, 2019

Related U.S. Application Data

(60) Provisional application No. 62/677,660, filed on May 29, 2018, provisional application No. 62/677,614, filed on May 29, 2018.

(51) Int. Cl.
G07C 9/00 (2020.01)
G06N 20/00 (2019.01)
(Continued)

(52) U.S. Cl.
CPC ..... *G07C 9/00571* (2013.01); *G06K 9/00476* (2013.01); *G06N 20/00* (2019.01);
(Continued)

(58) Field of Classification Search
CPC .............. G07C 9/00571; G06T 7/73; G06T 2207/20036; G06N 20/00; G06K 9/00476; G06Q 30/0641
See application file for complete search history.

(56) References Cited

U.S. PATENT DOCUMENTS

| | | | | |
|---|---|---|---|---|
| 6,922,701 B1 * | 7/2005 | Ananian | ................. | G06F 30/13 |
| 2008/0189166 A1 * | 8/2008 | Brooks | ................. | G06Q 10/00 |
| | | | | 705/315 |

(Continued)

OTHER PUBLICATIONS

International Search Report; US Patent & Trademark Office; International Application No. PCT/US2019/034449; dated Sep. 17, 2019; 2 pages.

(Continued)

*Primary Examiner* — Brian A Zimmerman
*Assistant Examiner* — Kevin Lau
(74) *Attorney, Agent, or Firm* — Taft Stettinius & Hollister LLP

(57) ABSTRACT

A method according to one embodiment includes determining, by a server, a location of a door in an architectural drawing and a room function of a room secured by the door based on an analysis of the architectural drawing, determining, by the server, proper access control hardware to be installed on the door based on the room function, a category of access control hardware, and a predictive machine learning model associated with the category of access control hardware, and generating, by the server, a specification based on the determined proper access control hardware.

20 Claims, 10 Drawing Sheets

(51) Int. Cl.
    *G06K 9/00*    (2006.01)
    *G06T 7/73*    (2017.01)
    *G06Q 30/06*   (2012.01)

(52) U.S. Cl.
    CPC .......... *G06Q 30/0641* (2013.01); *G06T 7/73* (2017.01); *G06T 2207/20036* (2013.01)

(56) References Cited

U.S. PATENT DOCUMENTS

| | | | |
|---|---|---|---|
| 2010/0173582 A1* | 7/2010 | Han | G06Q 10/06 455/41.1 |
| 2011/0016971 A1* | 1/2011 | Yulkowski | E05F 15/40 73/493 |
| 2013/0011069 A1* | 1/2013 | Quan | G06F 16/583 382/190 |
| 2018/0014341 A1* | 1/2018 | Jung | H04W 76/14 |
| 2020/0022217 A1* | 1/2020 | Ringland | H04W 4/80 |

OTHER PUBLICATIONS

Written Opinion of the International Searching Authority; US Patent & Trademark Office; International Application No. PCT/US2019/034449; dated Sep. 17, 2019; 8 pages.

* cited by examiner

AUTOMATED ARCHITECTURAL SPECIFICATION GENERATION AND HARDWARE IDENTIFICATION

CROSS-REFERENCE TO RELATED APPLICATIONS

This application claims the benefit of U.S. Provisional Application No. 62/677,614 filed on May 29, 2018 and U.S. Provisional Application No. 62/677,660 filed on May 26, 2018, the contents of each of which are incorporated herein by reference in their entirety.

BACKGROUND

Determining the proper door hardware for the various doors in a building is a long and tedious process. For example, each door in a commercial building may include one or more electronic locks, exit devices, door closers, reader devices, hinges, and/or other access control hardware, each of which may be selected from a wide array of types or models. Further complicating the issue is that different standards and regulations often apply to different doors depending on the type of door, location of the door, type of facility, and/or other extraneous factors. Architects rarely have the expertise to address these issues and, instead, they often rely on access control manufacturers to fill that knowledge gap.

Asset monitoring and device tracking has become ubiquitous with the prevalence of smartphones, wearable computing devices, and Internet of Things (IoT) devices. For example, radio frequency identification (RFID) tags are secured to devices for near-range monitoring. Similarly, smartphones and various other mobile devices are commonly subjected to near-range monitoring via Wi-Fi communication. However, long-range monitoring and/or tracking of mobile devices has essentially been limited to tracking devices via global positioning systems (GPS) and/or estimating the position of a device using, for example, triangulation based on the device's communication with cellular network towers. As such, there is a need for technologies involving the long-range monitoring of assets.

SUMMARY

According to an embodiment, a method may include determining, by a server, a location of a door in an architectural drawing and a room function of a room secured by the door based on an analysis of the architectural drawing, determining, by the server, proper access control hardware to be installed on the door based on the room function, a category of access control hardware, and a predictive machine learning model associated with the category of access control hardware, and generating, by the server, a specification based on the determined proper access control hardware. In some embodiments, determining the location of the door and the room function may include applying a plurality of morphological functions to the architectural drawing. In some embodiments, determining the location of the door and the room function may include applying a Houghlines function to determine line endpoints of a line in the architectural drawing. In some embodiments, determining the location of the door and the room function may include performing binary thresholding to the architectural drawing to generate a binary and applying a plurality of morphological functions to the binary image. In some embodiments, the method may further include determining, by the server, locations at which to position a plurality of gateway devices based on an analysis of the architectural drawings. In some embodiments, the category of access control hardware may be selected from a Door Hardware Institute (DHI) category of door hardware. In some embodiments, the method may further include monitoring a location of the determined proper access control hardware using a hardware tag secured to the proper access control hardware subsequent to acquisition of the proper access control hardware. In some embodiments, monitoring the location of the determined proper access control hardware may include monitoring the location of the determined proper access control hardware via a base station when the determined proper access control hardware is between fifteen and twenty-five kilometers in distance from the base station. In some embodiments, the method may further include interfacing, by the server, with an online marketplace for acquisition of a plurality of models of the determined proper access control hardware. In some embodiments, the online marketplace may identify the determined proper access control hardware offered by a plurality of device manufacturers.

According to another embodiment, a system may include at least one processor and at least one memory comprising a plurality of instructions stored thereon that, in response to execution by the at least one processor, causes the system to determine a location of a door in an architectural drawing and a room function of a room secured by the door based on an analysis of the architectural drawing, determine proper access control hardware to be installed on the door based on the room function, a category of access control hardware, and a predictive machine learning model associated with the category of access control hardware, and generate a specification based on the determined proper access control hardware. In some embodiments, wherein to determine the location of the door and the room function may include to perform binary thresholding to the architectural drawing to generate a binary image and apply a plurality of morphological functions to the binary image. In some embodiments, the plurality of instructions may further cause the system to determine one or more locations at which to position one or more gateway devices based on an analysis of the architectural drawings. In some embodiments, the category of access control hardware may be selected from a Door Hardware Institute (DHI) category of door hardware. In some embodiments, the plurality of instructions may further cause the system to monitor a location of the determined proper access control hardware using a hardware tag secured to the proper access control hardware subsequent to acquisition of the proper access control hardware. In some embodiments, the system may further include a base station, and wherein to monitor the location of the determined proper access control hardware may include to monitor the location of the determined proper access control hardware via the base station using communication signals of a first frequency band when the determined proper access control hardware is between fifteen and twenty-five kilometers in distance from the base station. In some embodiments, wherein to monitor the location of the determined proper access control hardware may include to further monitor the location of the determined proper access control hardware via the base station using communication signals of a second frequency band when the determined proper access control hardware is less than fifteen kilometers in distance from the base station.

According to yet another embodiment, at least one non-transitory machine-readable storage medium may include a plurality of instructions stored thereon that, in response to execution by a system, causes the system to determine a location of a door in an architectural drawing and a room function of a room secured by the door based on an analysis of the architectural drawing, determine proper access control hardware to be installed on the door based on the room function, a category of access control hardware, and a predictive machine learning model associated with the category of access control hardware, and generate a specification based on the determined proper access control hardware. In some embodiments, the category of access control hardware may be selected from a Door Hardware Institute (DHI) category of door hardware. In some embodiments, the plurality of instructions may further cause the system to monitor a location of the determined proper access control hardware using a hardware tag secured to the proper access control hardware subsequent to acquisition of the proper access control hardware. In some embodiments, the plurality of instructions may further cause the system to track a hardware tag secured to access control hardware using a distributed ledger.

According to an embodiment, a system for long-range asset monitoring may include a long-range tag secured to a mobile asset, a base station comprising a processor, a memory, and at least one antenna. The at least one antenna may be structured to wirelessly and directly communicate with the long-range tag via wireless communication signals having a nominal frequency of 433 MHz. The memory may include a plurality of instructions stored thereon that, in response to execution by the processor, causes the base station to communicate with the long-range tag via the at least one antenna and determine a location of the long-range tag based on the communication with the long-range tag. In some embodiments, the at least one antenna may be further structured to wirelessly and directly communicate with the long-range tag via wireless communication signals having a nominal frequency of 900 MHz. In some embodiments, the at least one antenna may be further structured to wirelessly and directly communicate with the long-range tag via wireless communication signals having a nominal frequency of 2.4 GHz. In some embodiments, the at least one antenna may include a first antenna and a second antenna, wherein the first antenna is structured to wirelessly and directly communicate with the long-range tag via the wireless communication signals having the nominal frequency of 433 MHz, and the second antenna is structured to wirelessly and directly communicate with the long-range tag via the wireless communication signals having the nominal frequency of 900 MHz. In some embodiments, the at least one antenna may further include a third antenna, wherein the third antenna is structured to wirelessly and directly communicate with the long-range tag via the wireless communication signals having the nominal frequency of 2.4 GHz. In some embodiments, the mobile asset may be located at a remote facility in which cellular communication is inhibited and power is unavailable. In some embodiments, the mobile asset may be an access control hardware component, and the plurality of instructions may further cause the base station to monitor the location of the access control hardware component from a shipping location to a construction site. In some embodiments, the access control hardware component may include an electronic lock. In some embodiments, the long-range tag may identify a status of the access control hardware component, and the status may be indicative of the access control hardware component requiring at least one of commissioning, configuration, or maintenance. In some embodiments, the long-range tag may include at least one inertial sensor configured to detect movement of the mobile asset, and the base station may be configured to receive an alert message from the long-range tag in response to movement of the mobile asset. In some embodiments, the system may further include a server configured to receive the alert message from the base station and transmit the alert message to an interface device for visualization by a user of the interface device via an application programming interface (API). In some embodiments, the plurality of instructions may further cause the base station to generate an alert message in response to determining that the location of the long-range tag is not consistent with an access attempt at a secure location. In some embodiments, the long-range tag may include a battery having a battery life of at least two years.

According to yet another embodiment a base station for long-range asset monitoring may include a communication circuitry structured to communicate via wireless communication signals having a nominal frequency of 433 MHz, a processor, and a memory having a plurality of instructions stored thereon that, in response to execution by the processor, causes the base station to receive a wireless communication signal from a long-range tag via the communication circuitry, wherein the wireless communication signal is indicative of an alert message, determine a location of the long-range tag based on the received wireless communication signal, and transmit the alert message and the determined location of the long-range tag to an interface device. In some embodiments, the communication circuitry may be further structured to communicate via wireless communication signals having a nominal frequency of 900 MHz. In some embodiments, the communication circuitry may be further structured to communicate via wireless communication signals having a nominal frequency of 2.4 GHz. In some embodiments, the alert message may indicate that the location of the long-range tag is inconsistent with an access attempt at a secure location. In some embodiments, the alert message may indicate that the long-range tag has moved. In some embodiments, the long-range tag may be secured to a mobile asset, wherein the alert message indicates that the mobile asset requires at least one of commissioning, configuration, or maintenance.

According to another embodiment, a method for long-range asset monitoring may include communicating, by a base station, with a long-range tag secured to a mobile asset via at least one antenna of the base station and determining, by the base station, a location of the long-range tag based on the communication with the long-range tag, wherein the at least one antenna of the base station is structured to wirelessly and directly communicate with the long.

Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
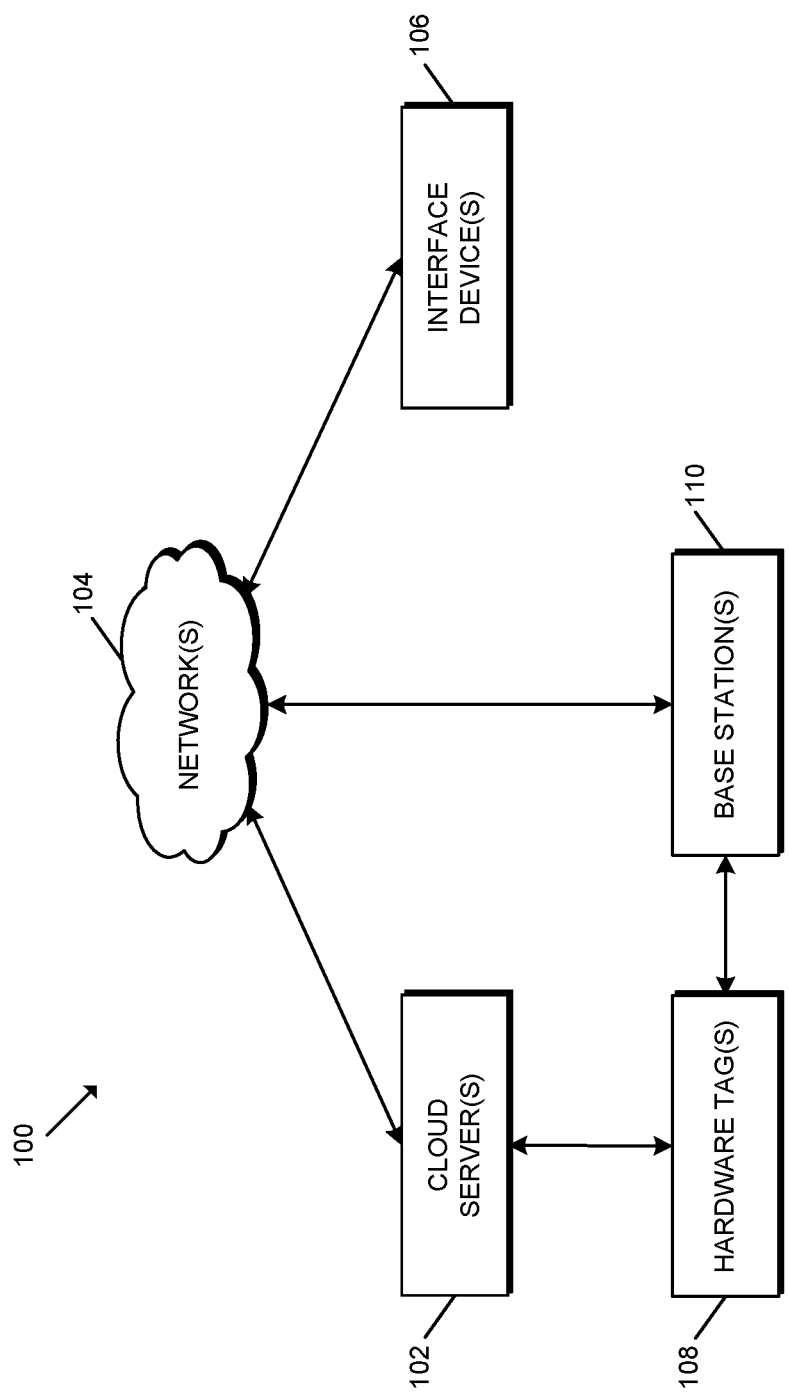
FIG. 1 is a simplified block diagram of at least one embodiment of a system for automated architectural specification generation and hardware identification and for long-range asset monitoring in access control and other environments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a system 100 for automated architectural specification generation and hardware identification, and for long-range asset monitoring in access control and other environments, includes one or more cloud servers 102, one or more networks 104, one or more interface devices 106, one or more hardware tags 108 (e.g., long-range tags 108), and one or more base stations 110. It should be appreciated that one or more of the devices 102, 104, 106, 108, 110 may be described herein as singular for clarity and brevity of the description; however, the disclosure is not so limiting and one or more of the devices 102, 104, 106, 108, 110 may be plural in various embodiments.

As described in detail below, in the illustrative embodiment, the system 100 analyzes architectural drawings to determine the locations for placement/installation of access control hardware such as electronic locks, gateway devices, and/or other access control hardware. Further, in the illustrative embodiment, the system 100 leverages trained predictive models to determine the appropriate access control hardware to be placed/installed at those locations (e.g., by part number) and generates a specification for the building. Additionally, the system 100 may provide and/or interface with an online marketplace that lists the appropriate access control hardware (e.g., of different manufacturers) for the various locations and allows users to acquire that access control hardware. Even further, in some embodiments, the system 100 may leverage long-distance hardware tags 108 secured to the access control hardware to subsequently monitor the locations of the access control hardware, for example, to ensure that the access control hardware identified by the system 100 is shipped to the proper job site, is not subject to theft, and is ultimately installed in the proper location.

It should be appreciated that each of the cloud server(s) 102, the interface device(s) 106, the hardware tag(s) 108, and/or the base station(s) 110 may be embodied as any type of device or collection of devices suitable for performing the functions described herein. More specifically, in the illustrative embodiment, the cloud server 102 may be configured to communicate with the various base stations 110 and interface devices 106. For example, the cloud server 102 may receive an alert message from a base station 110 and forward/transmit the alert message to the relevant interface device 106 for visualization by a user of the interface device 106 (e.g., via an application programming interface (API)). As such, it should be appreciated that the cloud server 102 may function as a monitoring, alerting, and/or reporting tool for the various base stations 110 in that communications may be routed through the cloud server 102 in order to identify the appropriate recipient devices.

Additionally, in some embodiments, the cloud server 102 may receive architectural drawings from a user interface device 106 of the architect and/or another user. Further, the illustrative cloud server 102 automatically determines the locations for access control hardware based on the architectural drawings, determines the proper access control hardware for those determined locations, and generates a specification including the determined hardware. Additionally, in some embodiments, the cloud server 102 may provide and/or interface with an online marketplace that allows users to acquire (e.g., automatically) the access control hardware appropriate for the building associated with the architectural drawings based on the generated specification. As described herein, the cloud server 102 may be utilized to monitor the acquired access control hardware subsequent to acquisition, for example, independently or in conjunction with one or more base stations 110.

It should be further appreciated that, in some embodiments, the cloud server 102 may be embodied as a "serverless" or server-ambiguous computing solution, for example, that executes a plurality of instructions on-demand, contains logic to execute instructions only when prompted by a particular activity/trigger, and does not consume computing resources when not in use. That is, the cloud server 102 may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the cloud server 102 described herein. For example, when an event occurs (e.g., data is transferred to the cloud server 102 for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of particular data is made (e.g., via an appropriate interface to the cloud server 102), the appropriate virtual function(s) may be executed to perform the actions before eliminating the instance of the virtual function(s). Although the cloud server 102 is described herein as a cloud-based device, it should be appreciated that the cloud server 102 may be embodied as, or include, one or more servers located "outside" of a cloud computing environment in other embodiments.

The access control hardware may be embodied as, or include, any type of device(s) and/or component(s) capable of controlling or supporting access through a passageway. For example, the access control hardware may be embodied as, or include, an electronic lock having a lock mechanism (e.g., a mortise lock mechanism, a cylindrical lock mechanism, a tubular lock mechanism, a latching mechanism, and/or a deadbolt mechanism). Further, in some embodiments, the access control hardware may include a credential reader or be electrically/communicatively coupled to a credential reader configured to communicate with credential-bearing devices. In some embodiments, it should be appreciated that the access control hardware may further include hinges and/or ancillary hardware.

The network 104 may be embodied as any type of communication network(s) capable of facilitating communication between the various devices communicatively connected via the network 104. As such, the network 104 may include one or more networks, routers, switches, access points, hubs, computers, and/or other intervening network devices. For example, the network 104 may be embodied as or otherwise include one or more cellular networks, telephone networks, local or wide area networks, publicly available global networks (e.g., the Internet), ad hoc networks, short-range communication links, or a combination thereof. Further, it should be appreciated that, in some embodiments, different networks 104 may be used depending on the source and/or destination devices 102, 106, 110 of the system 100.

The interface device 106 may be embodied as any type of device configured to communicate with the cloud server 102 (e.g., via a smartphone application or a client-side user interface to a web-based application/service of the cloud server 102), thereby allowing a user to interact with the cloud server 102. For example, as described below, an architect and/or other user may supply architectural drawings to the cloud server 102 for processing via an interface device 106. Further, in some embodiments, a user may use an interface device 106 to interact with the cloud server 102 to acquire the access control hardware via the online marketplace and/or to monitor the access control hardware. In some embodiments, the interface device 106 may display a "dashboard" accessible to the user, which may provide the user with relevant alerts, reports, and/or monitoring tools related to the hardware tags 108.

The base station 110 may be embodied as any type of device or collection of devices suitable for communicating with the hardware tags 108 over a long-distance radio frequency (RF) signal. For example, in the illustrative embodiment, the base station 110 includes multiple antennas for long-range communication (e.g., having maximum communication distance of approximately 25 km), mid-range communication (e.g., having a maximum line-of-sight communication distance of approximately 2 km), and short-range communication (e.g., for non-line-of-sight propagation) with the hardware tags 108. In particular, the base station 110 may include a first antenna for communication via a 433 MHz frequency signal (e.g., 433 MHz nominal frequency or frequency band), a second antenna for communication via a 900 MHz frequency signal (e.g., 900 MHz nominal frequency or frequency band), and a third antenna for communication via a 2.4 GHz frequency signal (e.g., 2.4 GHz nominal frequency or frequency band). In some embodiments, it should be appreciated that the base station 110 may communicate over two or more frequencies (e.g., selected from the group consisting of 433 MHz, 900 MHz, and 2.4 GHz) via a single antenna. It should be appreciated that, in some embodiments, the base station 110 may identify the location of a hardware tag 108 within approximately one meter of accuracy, for example, even when the hardware tag 108 is as far as 25 km away from the base station 110. In some embodiments, the cloud server 102, the interface device 106 (e.g., a mobile device), and/or another suitable computing device may include the features of and/or otherwise perform one or more functions of the base station 110. For example, in some embodiments, the interface device 106 may be embodied as a mobile device and configured to communicate with the hardware tags via Bluetooth™ and/or another suitable wireless communication protocol (e.g., up to 100 m in range). In other words, in some embodiments, a mobile device may serve as a mobile base station 110.

Each of the hardware tags 108 (or long-range tags 108) may be embodied as any type of device(s) and/or component(s) configured to wirelessly communicate with the base station 110 and otherwise perform the functions described herein. In some embodiments, the hardware tags 108 are configured to wirelessly communicate with the base station 110 and/or other devices via signals at one or more frequencies or frequency bands (e.g., each of 433 MHz, 900 MHz, and 2.4 GHz). Further, in some embodiments, the hardware tags 108 may include one or more sensors configured to generate sensor data (e.g., by virtue of one or more signals) associated with one or more characteristics of the physical environment of the hardware tags 108. For example, in various embodiments, the sensors may include environmental sensors (e.g., temperature sensors), inertial sensors (accelerometers, gyroscopes, etc.), proximity sensors, optical sensors, electromagnetic sensors (e.g., magnetometers, etc.), audio sensors, motion sensors, piezoelectric sensors, and/or other types of sensors. As such, in some embodiments, the hardware tags 108 may be configured to inform/alert the base station 110 of any detected movement, temperature changes, shock/vibrations, unauthorized accesses, location changes, and/or other relevant contextual data. In some embodiments, the hardware tags 108 are embodied as smart tags. As described herein, in some embodiments, the hardware tags 108 may be secured to access control hardware to allow the cloud server 102 (e.g., directly or via a base station 110) to monitor the location of the access control hardware at various points in time. It should be appreciated that the battery within the hardware tag 108 may vary depending on the intended application of the tag 108. For example, in some embodiments, the hardware tag 108 may have a very small form factor and have a battery with a battery life of only a few years (e.g., two years), whereas in other embodiments, the battery life may be as long as ten years or longer.

In some embodiments, the hardware tags 108 may be tracked using a distributed ledger such as blockchain. Particularly, each device with a hardware tag 108 may be a node on the blockchain with its characteristics (e.g., type of device, serial number, etc.), features, location, and/or state (temperature, vibration, position, etc.) that may be stored and/or updated on the blockchain. In such embodiments, administrators may be able to use the blockchain to track and monitor assets (e.g., access control hardware) as they move from manufacturing to installation. The blockchain adds transparency so that information about assets may be used to provide higher customer service such as warranty dates, life of the product, how the asset is being used (which often depends on its installation location within a building), preventative maintenance, repair, replacement opportunities (e.g., leads for sales opportunities based on time in the field and/or use), and/or other relevant information. Further, in other embodiments, it should be appreciated that the hardware tags 108 may be otherwise embodied. For example, one or more of the hardware tags 108 may be embodied as a QR code or other unique identifier in other embodiments.

It should be appreciated that each of the cloud server(s) 102, the interface device(s) 106, and/or the base station(s) 110 may be embodied as one or more computing devices similar to the computing device 200 described below in reference to FIG. 2. For example, in the illustrative embodiment, each of the cloud server(s) 102, the interface device(s) 106, and/or the base station(s) 110 includes a processing device 202 and a memory 206 having stored thereon operating logic 208 for execution by the processing device 202 for operation of the corresponding device. Additionally, it should be appreciated that each of the hardware tag(s) 108 may include one or more features similar to the features described below in reference to the computing device 200 of FIG. 2.

Figure 2:
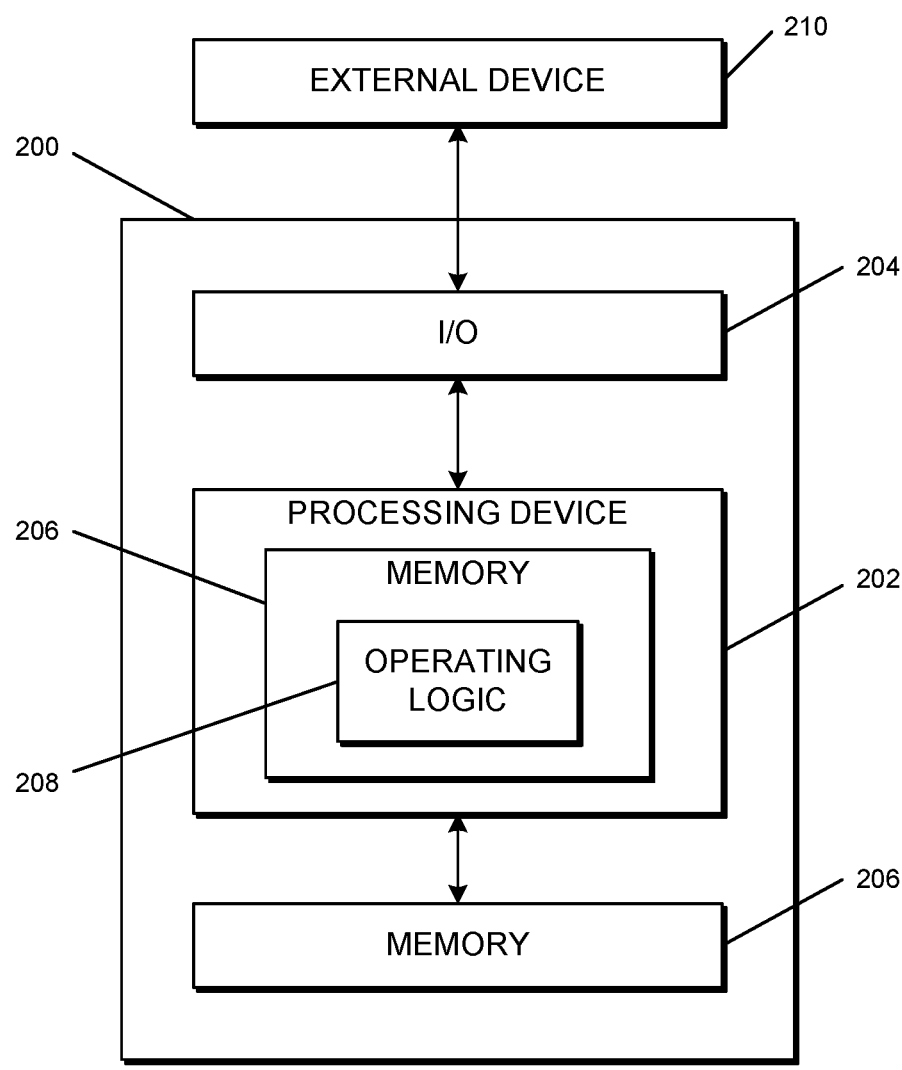
FIG. 2 is a simplified block diagram of at least one embodiment of a computing system.

Referring now to FIG. 2, a simplified block diagram of at least one embodiment of a computing device 200 is shown. The illustrative computing device 200 depicts at least one embodiment of the cloud server(s) 102, the interface device(s) 106, and/or the base station(s) 110 illustrated in FIG. 1. Depending on the particular embodiment, the computing device 200 may be embodied as a server, desktop computer, laptop computer, tablet computer, notebook, netbook, Ultrabook™, mobile computing device, cellular phone, smartphone, wearable computing device, personal digital assistant, Internet of Things (IoT) device, reader device, access control device, camera device, control panel, processing system, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 200 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as the cloud server(s) 102, the hardware tag(s) 108, the interface device(s) 106, and/or the base station(s) 110. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is programmable and executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable type, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

Figure 3:
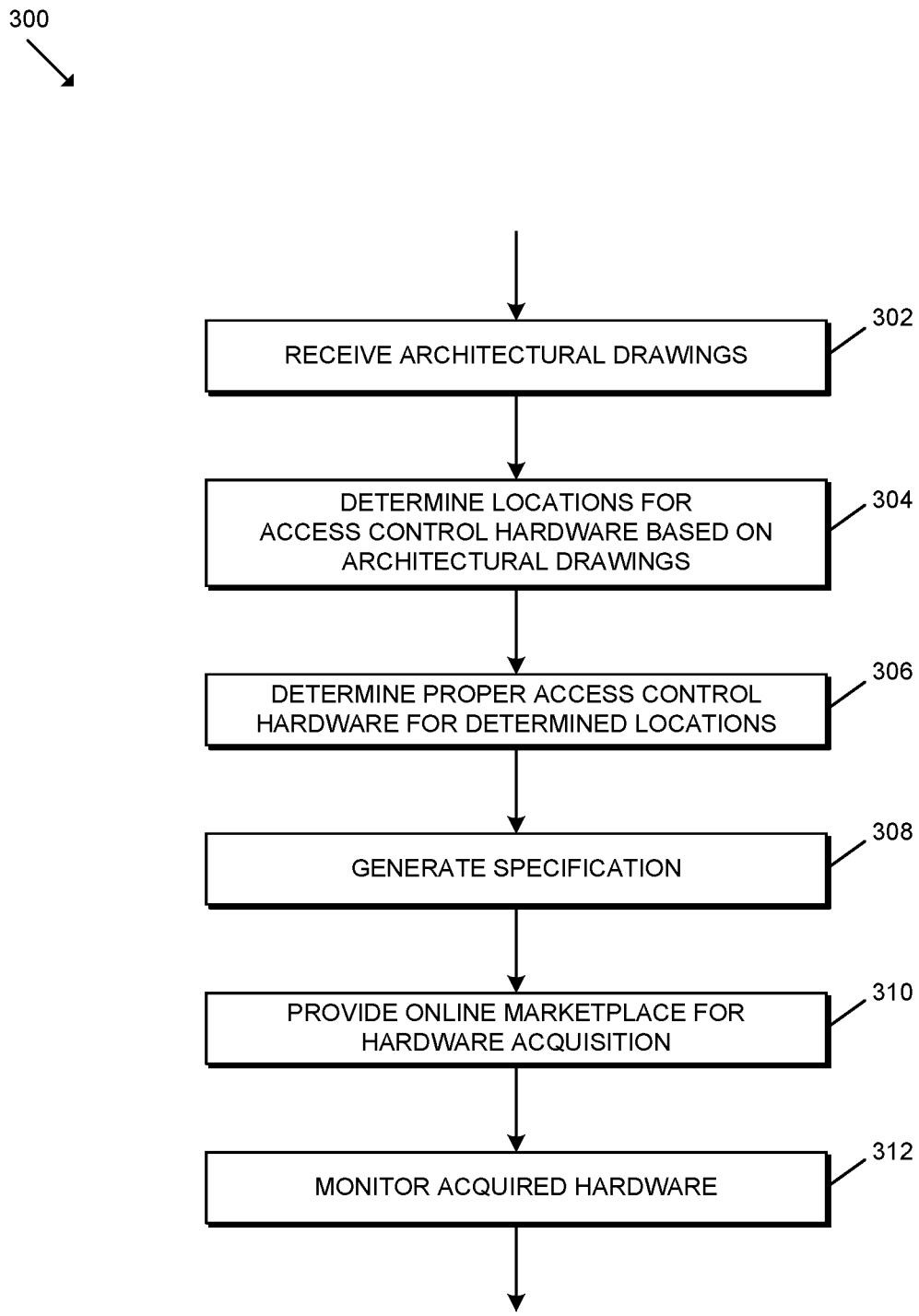
FIG. 3 is a simplified flow diagram of at least one embodiment of a method for automated architectural specification generation and hardware identification.

Referring now to FIG. 3, in use, the system 100 or, more specifically, the cloud server 102 may execute a method 300 for automated architectural specification generation and access control hardware identification, acquisition, and/or monitoring. It should be appreciated that the particular blocks of the method 300 are illustrated by way of example, and such blocks may be combined or divided, added or removed, and/or reordered in whole or in part depending on the particular embodiment, unless stated to the contrary.

Figure 6:
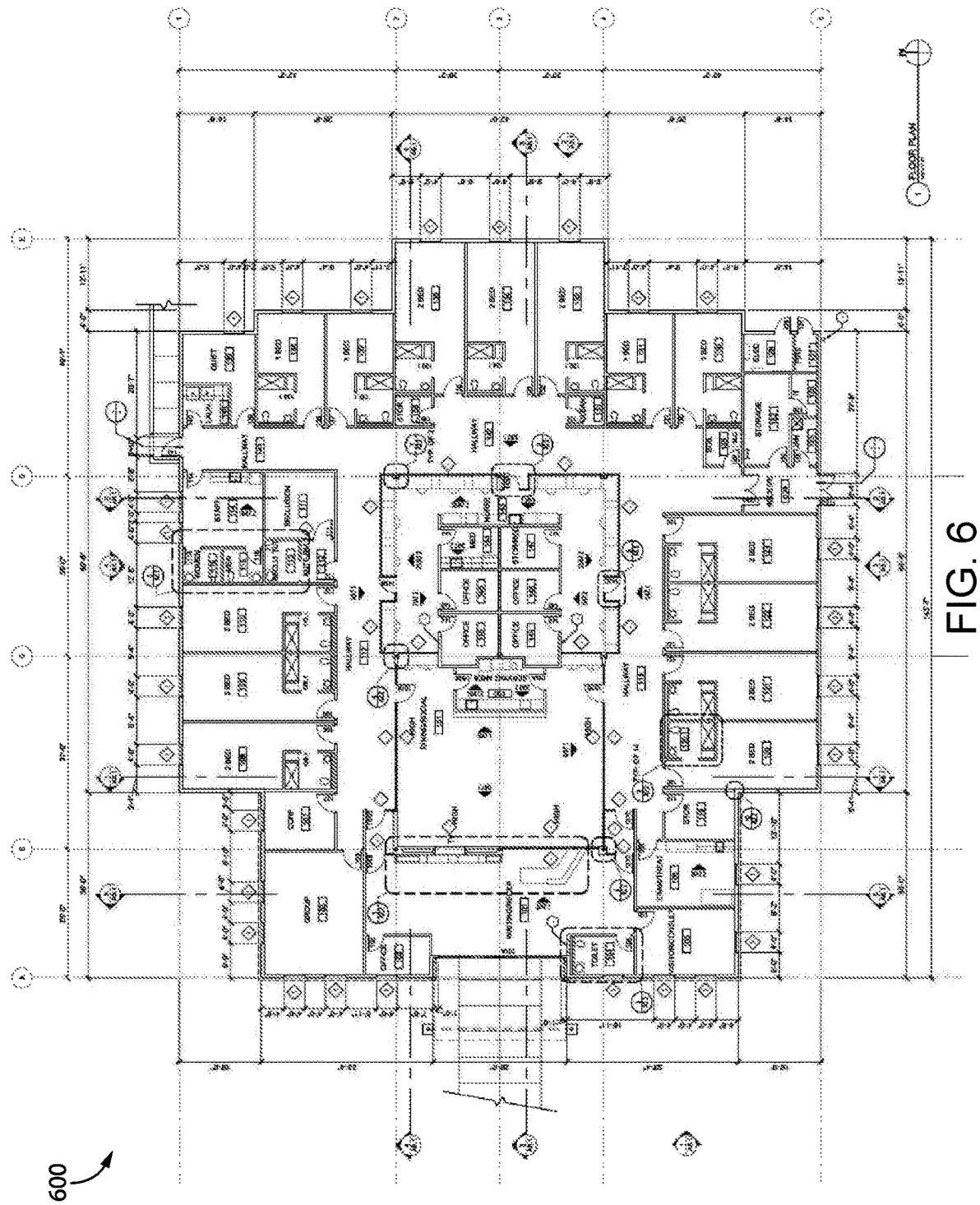
FIG. 6 illustrates an example embodiment of an architectural drawing.
Figure 7:
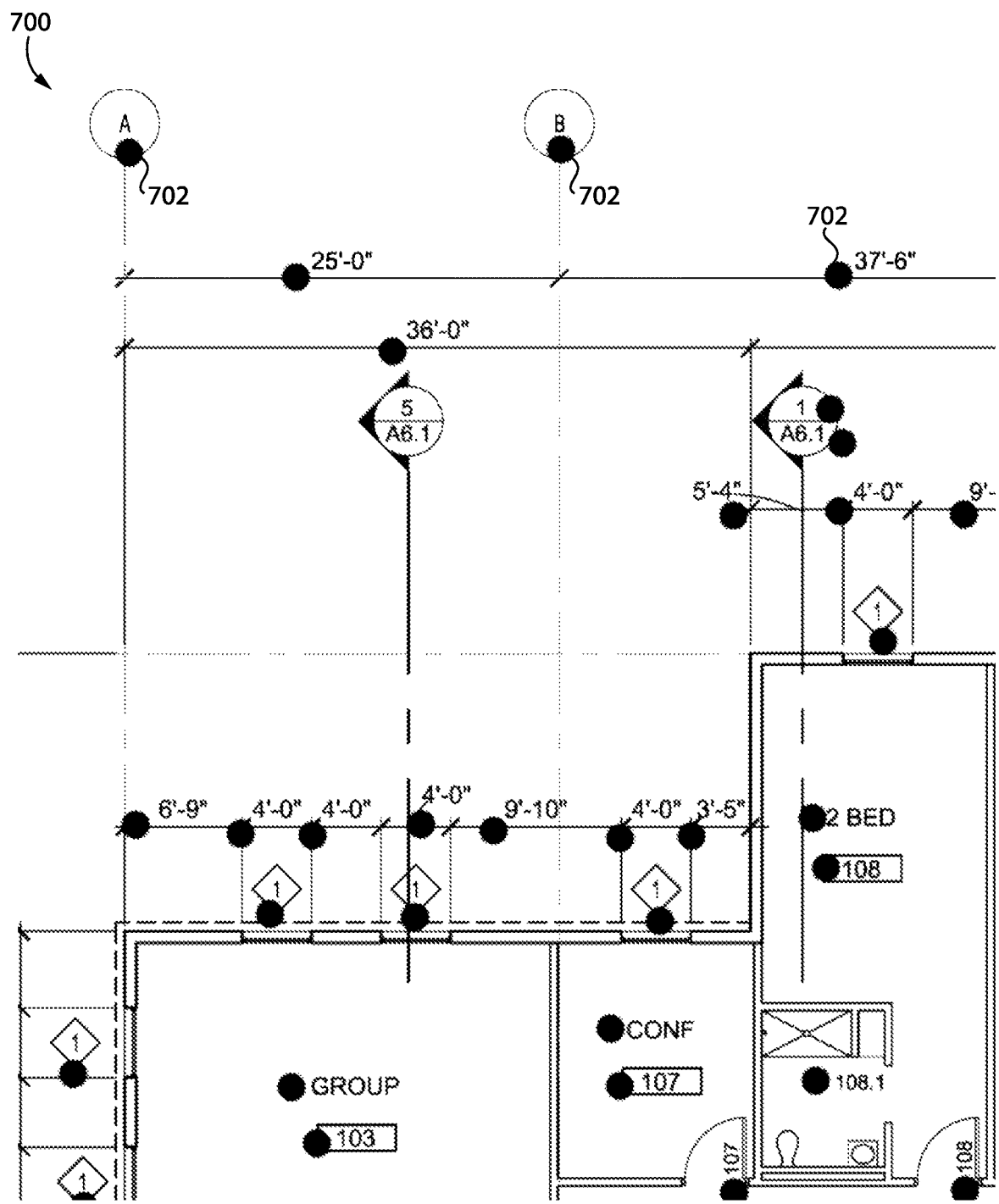
FIG. 7 illustrates a portion of the architectural drawing of FIG. 6 in which the locations of text displayed therein have been identified.

The illustrative method 300 begins with block 302 in which the cloud server 102 receives one or more architectural drawings, for example, from an interface device 106 and/or retrieves a previously received architectural drawing from memory. In some embodiments, the cloud server 102 receives an "unflattened" portable document format (PDF) file that includes an architectural drawing/image (e.g., a portable network graphics (PNG) image) and a file identifying text in the image and the pixel coordinates thereof. For example, the file may be embodied as a JavaScript Object Notation (JSON) file that includes key-value pairs identifying the text in the image and the pixel coordinates of each piece of identified text. Further, in some embodiments, the coordinates may be converted from scalable vector graphics (SVG) coordinates into pixel coordinates for the application of the computer vision techniques described herein. In some embodiments, the architectural drawings may be "completely unflattened" in which each piece of text in the image is associated with a text coordinate in the JSON file, whereas in other embodiments, the architectural drawings may be only partially unflattened or flattened. In such embodiments, the cloud server 102 may employ text recognition techniques to identify the text in the architectural drawing and the coordinates thereof. An embodiment of an architectural drawing 600 is depicted in FIG. 6 and the pixel coordinates of the text are represented by dots 702 in the portion 700 of the architectural drawing 600 as depicted in FIG. 7. For clarity of the drawings, it should be appreciated that FIG. 7 identifies only a subset of the pixel coordinates of the text in the portion 700 of the architectural drawing 600 by the reference numeral 702.

In block 304, the cloud server 102 determines the locations for the access control hardware (e.g., electronic locks on doors, gateway devices, etc.) based on the architectural drawings. In particular, it should be appreciated that the cloud server 102 may automate the detection of door openings and identify the spaces surrounding each door, for example, in order to simplify and expedite training and processing for specification writers. In doing so, the cloud server 102 may employ computer vision to detect doors and other keys features in the architectural drawings, and for each door, the cloud server 102 may identify the name/type of the spaces on each side of the door opening (e.g., room/space names). As described below, such data may be further processed by a hardware prediction model to identify the appropriate access control hardware for the doors. In the illustrative embodiment, it should be appreciated that the cloud server 102 executes the method 400 of FIG. 4 for determining the locations for access control hardware based on the architectural drawings. However, in other embodiments, other suitable techniques may be employed.

Figure 4:
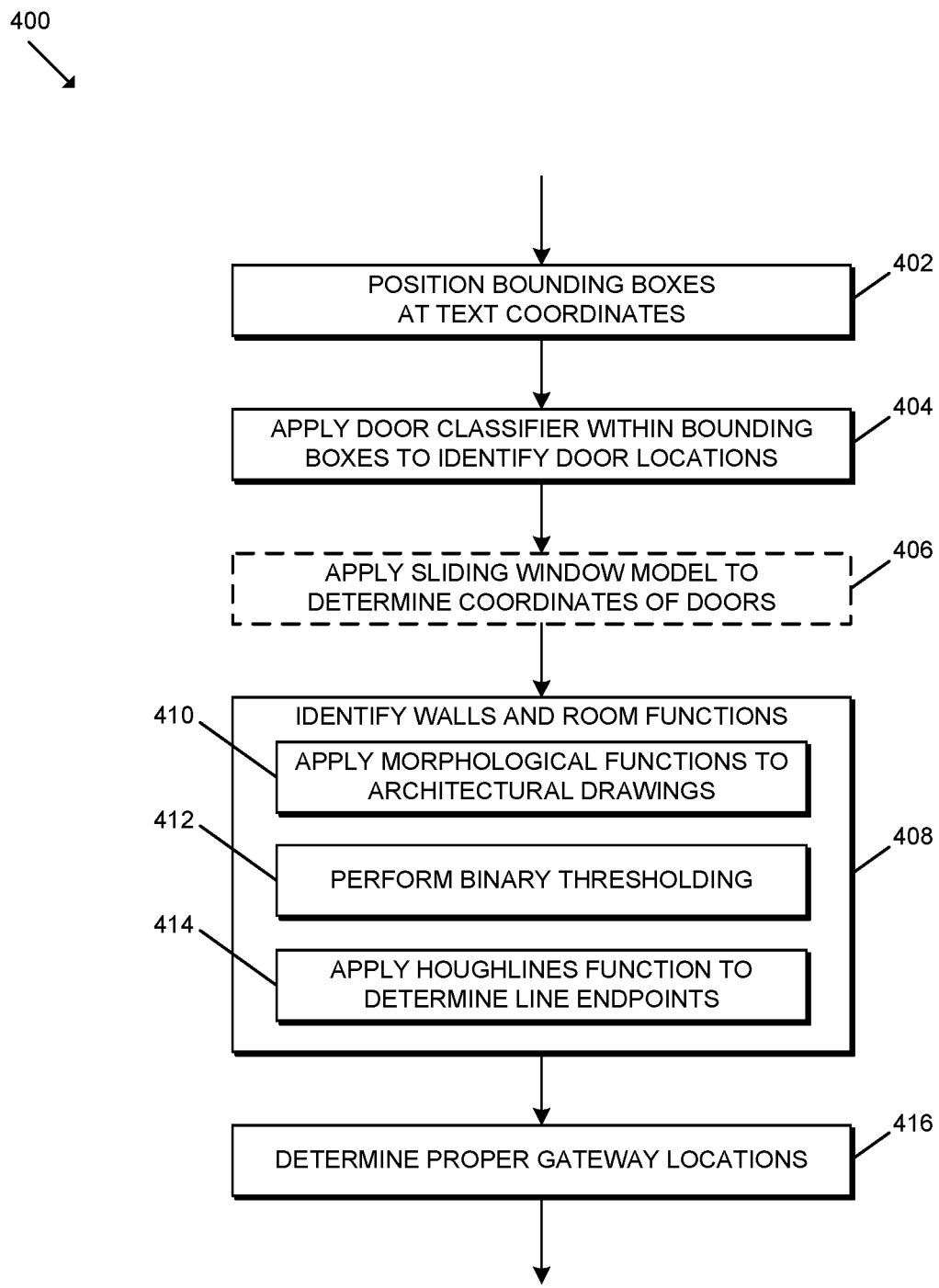
FIG. 4 is a simplified flow diagram of at least one embodiment of a method for determining locations for access control hardware based on architectural drawings.

Referring now to FIG. 4, in use, the system 100 or, more specifically, the cloud server 102 may execute a method 400 for determining locations for access control hardware based on architectural drawings. It should be appreciated that the particular blocks of the method 400 are illustrated by way of example, and such blocks may be combined or divided, added or removed, and/or reordered in whole or in part depending on the particular embodiment, unless stated to the contrary.

The illustrative method 400 begins with block 402 in which the cloud server 102 positions bounding boxes at the coordinates of the text identified, for example, in the JSON file (i.e., in embodiments in which the architectural drawings are unflattened) or other type/format of architectural drawing. It should be appreciated that, in some embodiments, the size of the bounding boxes may depend on the scale of the architectural drawing. For example, in some embodiments in which the drawing has one eighth inch to one foot scale, the bounding box may be approximately 600×600 pixels in size, whereas the size of the bounding box may differ in embodiments in which the scale is metric or otherwise differs (e.g., one fourth inch to one foot scale). In some embodiments, the scale of the architectural drawing may be automatically determined by the cloud server 102, whereas the scale may be provided with the architectural drawing in other embodiments.

Figure 9:
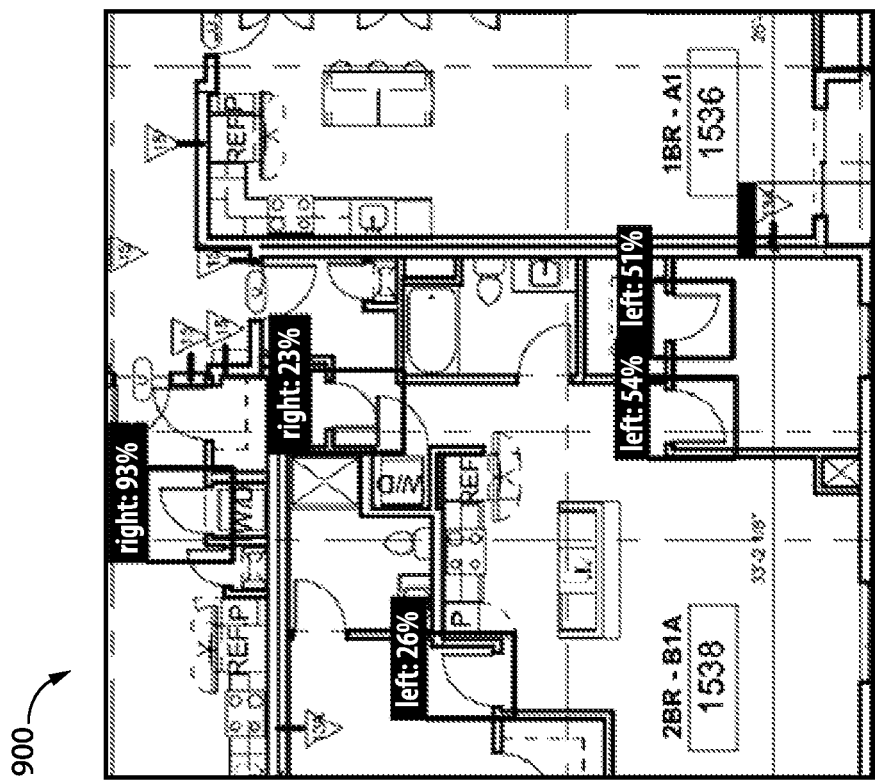
FIGS. 8-9 illustrate a portion of an architectural drawing in which the locations of doors displayed therein have been identified.
Figure 8:
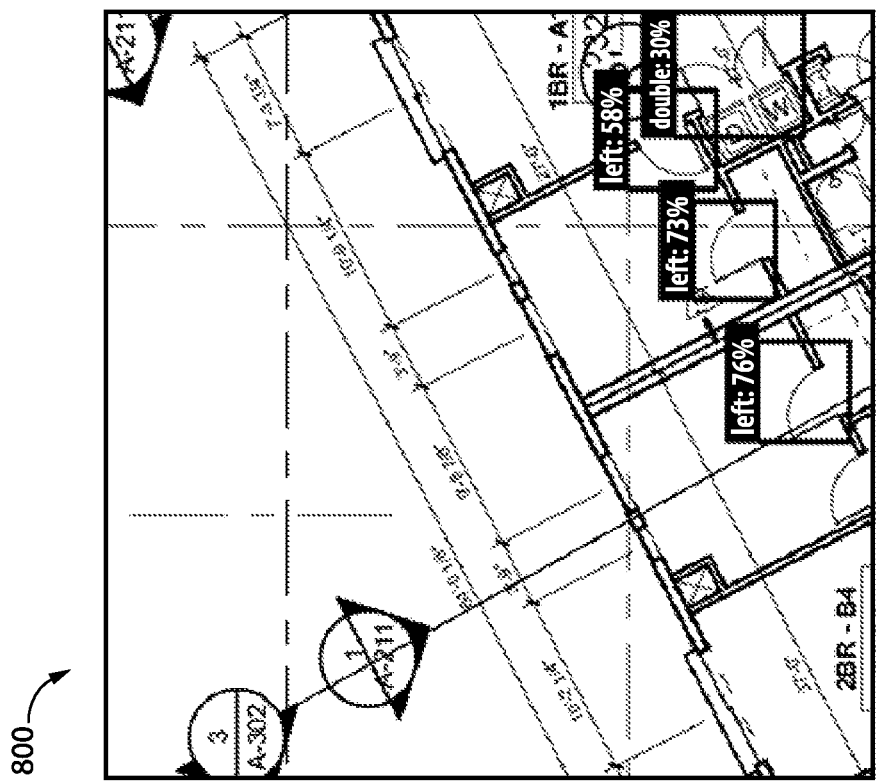

In block 404, the cloud server 102 applies a door classifier within (or around) the bounding boxes to identify door locations. For example, the cloud server 102 may employ an algorithm that determines the probability that the portion of the image within the bounding box corresponds with that of a door. Further, in some embodiments, the cloud server 102 may also determine the probability that the portion of the image within the bounding box is a specific type of door (e.g., left-opening, right-opening, double door, etc.). However, in some embodiments, the output is binary, thereby indicating that the text within the bounding box either corresponds with or does not correspond with the location of a door. Identification of the doors/openings, including the corresponding bounding boxes, is depicted in the processed partial architectural drawings 800, 900 of FIGS. 8-9 by way of example.

As described above, in some embodiments, the architectural drawing may not be completed unflattened. As such, it should be appreciated that the cloud server 102 may further analyze the architectural drawing to identify the locations of doors/openings. In particular, in block 406, the cloud server 102 may apply a sliding window model and/or a secondary Recurrent Convolutional Neural Network (RCNN) or other deep learning detection model to further determine the coordinates of other doors/openings. For example, the sliding window may be applied to an entirety or a subset of the drawing, analyzing the corresponding pixels to determine whether they are associated with a door/opening. In some embodiments, the door locations identified by the sliding window model may be compared to the pixel coordinates included in the unflattened portion of the image to ensure no duplicate door identification has occurred.

It should be appreciated that the analysis of the image associated with the text coordinates involves filtering out those text coordinates that are not associated with doors/openings. It should be further appreciated that, in analyzing points in the image (e.g., inside the bounding box/window), several features may be retrieved. Such features may include pixel densities/distributions, contour properties (e.g., number of contours inside area, shape of contours, area of contours, perimeter of contours, aspect ratio of contours, extent of contours, convex hull of contours, solidity of contours, etc.), and/or other features, which may be provided to a prediction model that determines the probability that the point (and the area around it) is indicative of a door location.

In block 408, the cloud server 102 identifies wall and room functions depicted in the architectural drawing. In particular, the cloud server 102 may iterate various "cleaning" and identification steps to identify the walls. In block 410, the cloud server 102 may apply morphological functions to the architectural drawing. Such morphological functions may include various iterations of erosion and dilation functions. Specifically, in some embodiments, the cloud server 102 applies various combinations of closing and opening morphological functions that "blur" lines until certain lines combine (e.g., double-lined walls) and then "narrow" the lines back. It should be appreciated that such morphological function iterations may remove small insignificant lines in the architectural drawing and leave more significant wall lines.

In block 412, the cloud server 102 may further perform binary thresholding to the architectural drawings. For example, a grayscale architectural drawing may include various shades of gray lines that are processed to be either black or white (e.g., based on a threshold pixel intensity value of 100).

Figure 10:
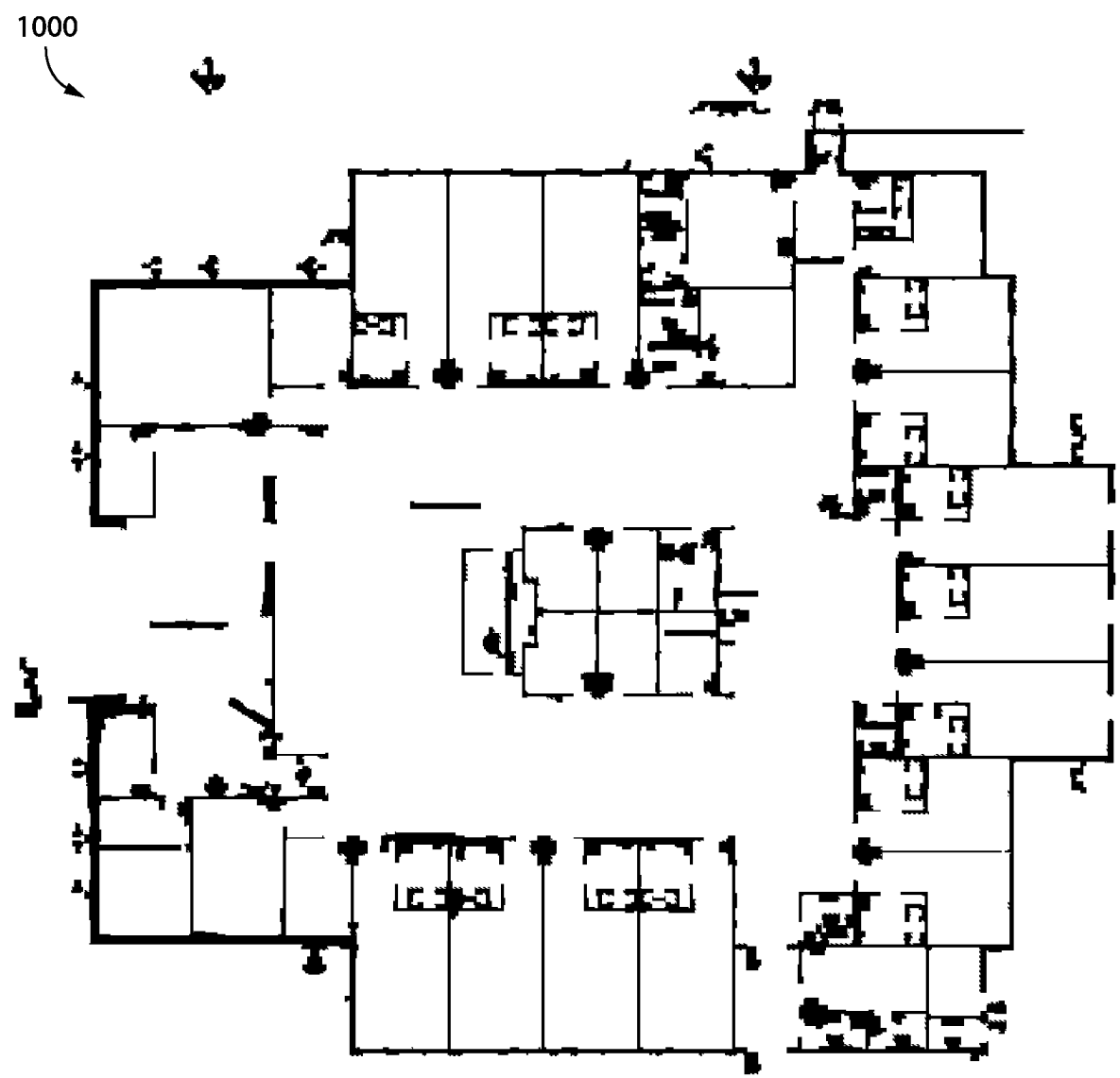
FIG. 10 illustrates a processed version of the architectural drawing of FIG. 6 in which the walls have been identified.

In block 414, the cloud server 102 may apply a Houghlines function to the architectural drawing (e.g., after applying the morphological functions and/or performing the binary thresholding) to determine the endpoints of each line in the architectural drawing. A processed version 1000 of the architectural drawing 600 of FIG. 6 in which the walls have been identified and the Houghlines function has been applied is depicted in FIG. 10. It should be appreciated that the image processing functions described in reference to block 410-414 may performed in another order in another embodiment. For example, in some embodiments, one or more morphological functions may be applied to a binary image generated through binary thresholding.

It should be further appreciated that end point locations may be used in conjunction with the door coordinates to determine room locations/labels relative to the door (e.g., using the nearest labels not a label of the door itself). For example, the coordinates of the four corners of the bounding box within which a door is located are known and, therefore, vectors distances and point distances may be calculated to find the closest label to identify the interior of a space. It should be appreciated that the exterior space is often a hallway, which is rarely labeled in an architectural drawing. It should be further appreciated that the identification of the room function (e.g., via the corresponding room label) improves the accuracy of the access control hardware prediction described below.

Figure 11:
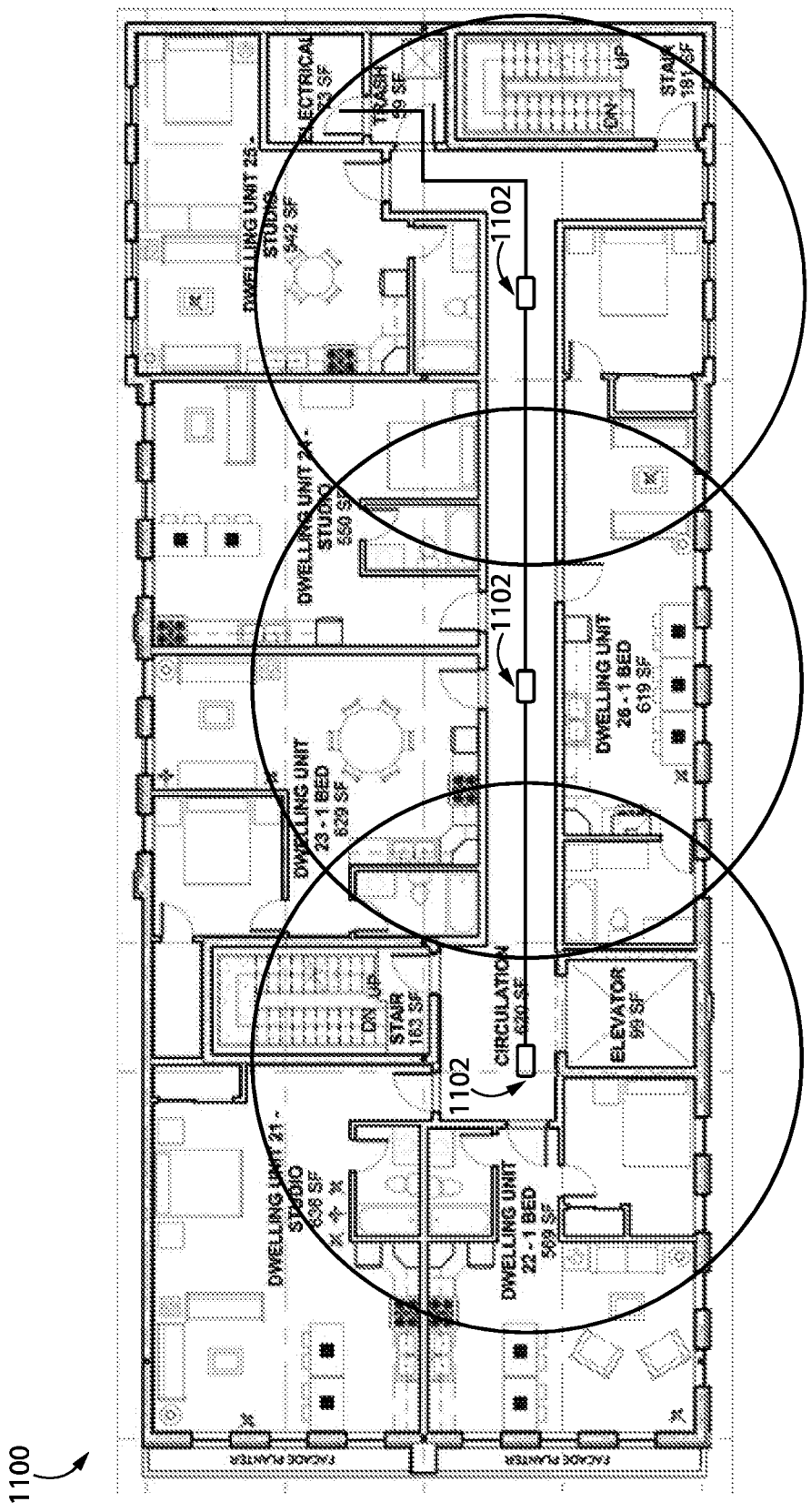
FIG. 11 illustrates an architectural drawing in which proper locations for a set of gateway devices have been identified.

In block 416, the cloud server 102 may further identify locations at which to position a plurality of gateway devices 1102 based on an analysis of the architectural drawings (see, e.g., the architectural drawing 1100 of FIG. 11). For example, based on the room function and the locations of the access control hardware that will communicate with the gateway devices 1102, the cloud server 102 identifies the most efficient placement of the gateway devices 1102 (e.g., to ensure adequate). In doing so, it should be appreciated that the cloud server 102 may further determine the number of gateway devices 1102 needed based on the particular layout and/or room dimensions depicted in the architectural drawing.

Although the blocks 402-416 are described in a relatively serial manner, it should be appreciated that various blocks of the method 400 may be performed in parallel in some embodiments.

Returning to FIG. 3, in block 306, the cloud server 102 determines the proper access control hardware to be installed on the doors based, for example, on the corresponding room functions, the category of access control hardware, and the predictive machine learning model. In particular, it should be appreciated that, in the illustrative model, the cloud server 102 utilizes a machine-learning driven recommendation engine for providing an intelligent list of recommended door hardware parts for an opening with specific properties (e.g., provided via a web API authenticated using Auth0). It should be appreciated that the cloud server 102 may identify the proper predictive machine learning model to use based on the category of the relevant door hardware part associated with the opening. In particular, in the illustrative embodiment, there are different categories of pieces based on the Door Hardware Institute (DHI) categories of the hardware part: close, hang, kick, lock, other, push/pull, seal, and stop. In some embodiments, the cloud server 102 automatically determines the appropriate category (e.g., based on the room function, end user, opening properties, and/or other data), whereas in other embodiments, the appropriate category is user-provided or otherwise supplied. It should be appreciated that the number and type of DHI categories may vary over time.

In some embodiments, the recommended door hardware parts are provided via a web API hosted by the cloud server 102. For example, the API may load a transformation mapper (e.g., including a mapping dictionary) and a set of trained models, and the prediction algorithm may predict the probability that a given hardware component would be used for the identified openings. In some embodiments, the API may return a list of the hardware catalog numbers, for example, listed in descending order with the most probable parts appearing first on the list. It should be appreciated that the cloud server 102 may execute the method 500 of FIG. 5 described below for training the predictive models for door hardware prediction.

In block 308, the cloud server 102 generates a specification based on the architectural drawings and the proper access control hardware determined for each of the doors in the architectural drawings. In block 310, the cloud server 102 may further provide and/or interface with an online marketplace for acquisition of a plurality of models of the proper access control hardware. For example, various manufacturers may be enrolled in the marketplace to have their parts listed and, when identified as a proper part for a corresponding door, the part may be listed via the online marketplace. In other embodiments, it should be appreciated that parts of only a single manufacturer may be listed.

In block 312, the cloud server 102 may monitor the access control hardware acquired via the online marketplace, for example, using hardware tags 108 secured to the corresponding access control hardware. As described above, in some embodiments, the hardware tags 108 may be monitored by the base station 110 at a distance as far as twenty-five kilometers from the base station 110. As such, in some embodiments, the access control hardware may be monitored via a base station 110 when the tagged access control hardware is at such a distance (e.g., between fifteen and twenty-five kilometers) from the base station 110.

It should be appreciated that the system 100 and the hardware tags 108, more specifically, may be leveraged for a multitude of applications. For example, the hardware tags 108 may be used in access control environments/applications, such as construction site locators for access control hardware. In particular, in some embodiments, the hardware tags 108 allow for micro-location detection of access control hardware in inventory, on a construction site, during transit, and otherwise. Further, in some embodiments, the tagged access control hardware may be leveraged to verify that the proper access control hardware is installed on a particular door. For example, in some embodiments, a tagged access control hardware component may be tracked (e.g., via a construction site management tool) from placement of an order (e.g., via the online marketplace) of the tagged access control hardware component, through shipment and delivery of the component (e.g., providing delivery confirmation), and further through installation verification. As such, critical hardware may be tagged with a hardware tag 108 to ensure delivery and confirmation of the correct installation location, while simultaneously reducing the risk of the theft without asset recovery (e.g., generating an alert in response to unauthorized movement). Further, in some embodiments, the hardware tags 108 may be used for asset tracking of tools, equipment, pallets, and/or other important components/devices on a large construction site and, in some embodiments, may be leveraged to assist in the disposition of assets. In some embodiments, the tags 108 may further be leveraged to identify devices that need to be fixed/commissioned/configured and/or identify the installation status (and otherwise simplify the installation) of devices. In some embodiments, the hardware tags 108 may be secured to personal protective equipment (e.g., helmets, radiation scanners, etc.) to ensure workers and/or guests on a construction site are using such equipment and/or to detect the occurrence of a safety-related event (e.g., based on sensor data generated during an accident endured by the wearer).

Although the blocks 302-312 are described in a relatively serial manner, it should be appreciated that various blocks of the method 300 may be performed in parallel in some embodiments.

Figure 5:
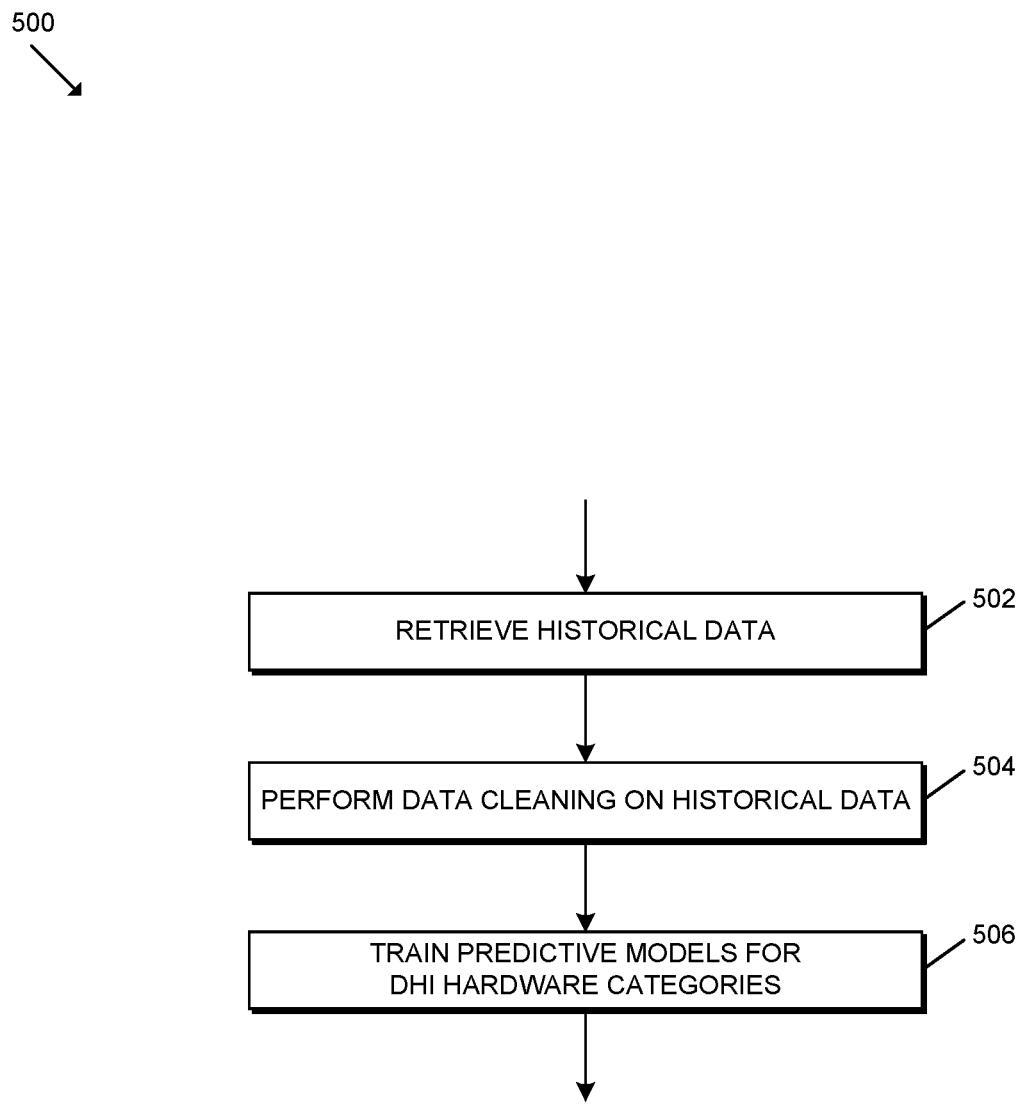
FIG. 5 is a simplified flow diagram of at least one embodiment of a method for training predictive models for door hardware prediction.

Referring now to FIG. 5, in use, the system 100 or, more specifically, the cloud server 102 may execute a method 500 for training predictive models for door hardware prediction. It should be appreciated that the particular blocks of the method 500 are illustrated by way of example, and such blocks may be combined or divided, added or removed, and/or reordered in whole or in part depending on the particular embodiment, unless stated to the contrary. The illustrative method 500 begins with block 502 in which the cloud server 102 retrieves historical data. For example, the cloud server 102 may retrieve data associated with the historical manual generation of building specifications (e.g., identifying the project, client, location, physical properties of openings, the specified hardware for each opening, and/or other suitable specification data).

In block 504, the cloud server 102 performs data cleaning operations on the historical data. For example, it should be appreciated that various data in the historical data may include data quality issues. As such, the cloud server 102 automatically applies various configurable data cleaning rules to remove data of poor quality. For example, in some embodiments, the cloud server 102 removes data without complete information (e.g., missing the identified door hardware). Further, the cloud server 102 may remove data associated with a particular part number if that part number has been used an insufficient number of timed to qualify as useful training data (e.g., fewer than 5 projects). Other data cleaning rules, for example, may be associated with the door thickness, door height, door width, door rating, and/or other relevant parameters.

In block 506, the cloud server 102 trains the predictive models for the various part categories. As described above, in the illustrative embodiment, the cloud server 102 trains a separate predictive machine learning model for each category of relevant door hardware part. Further, in the illustrative embodiment, the different categories are eight DHI part categories: close, hang, kick, lock, other, push/pull, seal, and stop. As indicated above, however, it should be appreciated that the DHI part categories may vary by type and/or number over time. In some embodiments, the data for each category is input into its own gradient-boosted random forest model; however, it should be appreciated that the cloud server 102 may leverage other types of models in other embodiments. As described above, when a determination is made regarding the proper access control hardware, the cloud server 102 retrieves the appropriate predictive model from the corresponding categories.

It should be further appreciated that the cloud server 102 may train and/or leverage a predictive model for mapping door schedule data into a set of particular fields with a high degree of accuracy. As such, machine learning algorithms may leverage a predictive model to reduce or eliminate the cumbersome, complicated, and error-prone process of mapping door schedule data to the proper fields. Accordingly, in some embodiments, an architect may provide a door schedule via an interface device 106, which is completely (or partially) mapped automatically and accurately with no human intervention. In some embodiments, a standardized mapping may be used for both properties (e.g., columns in a door schedule) and values (e.g., rows in a door schedule). Additionally, it should be appreciated that the model may be leveraged to map other data (e.g., incoming hardware sets) in other embodiments.

Although the blocks 502-506 are described in a relatively serial manner, it should be appreciated that various blocks of the method 500 may be performed in parallel in some embodiments.

It should be appreciated that the hardware tags 108 may also be used for multi-factor (sensor) confirmation for authorized access/usage across multiple applications. For example, the hardware tags 108 may be secured to various equipment and configured to provide notifications of unauthorized use of the equipment (e.g., based on movement of the equipment, access to the equipment without possessing the appropriate hardware tag 108, and/or otherwise). In some embodiments, the hardware tags 108 may be similarly used to provide notifications of unauthorized entry/access to an asset/location. For example, if a particular secured location (e.g., server room) or asset is accessed without a secondary hardware tag 108 or mobile base station (e.g., in the vicinity of the secured location or asset), the hardware tag 108 or the base station 110 may generate an alert notification (e.g., indicating that the location of the tag 108 is inconsistent with the access attempt). Further, the sensors of the hardware tags 108 may be leveraged to provide improved data analytics regarding device functions (e.g., abusing door openings, thermal events, etc.).

It should be further appreciated that the hardware tags 108 may be used to provide notification of access and/or other events at remote facilities. For example, in some circumstances, the distance of a particular facility from infrastructure (e.g., distance from cellular network towers, power grids, etc.) may preclude traditional access to power systems or communication networks. In such embodiments, the base station 110 may communicate with the hardware tags 108 to receive feedback from the remote facility in the form of sensor data from the hardware tags 108 and/or data associated with the movement of assets at the remote facility. As such, the system 100 may identify unauthorized access to isolated or infrequently used facilities (e.g., concessions, outbuildings, storage facilities) without installing the typical access control system/infrastructure to do so. Further, in some embodiments, the hardware tags 108 may serve as an ad hoc emergency services infrastructure for tracking critical resources such as food, water, and fuel, for example, in disaster recovery and/or other relief environments.

The system 100 may be leveraged for various other applications. For example, the system 100 may function as a lightweight perimeter security system (e.g., for a school, church, or other institution) for monitoring buildings, gates, and other openings/passageways without installing a traditional access control system. Further, it should be appreciated that the system 100 may be utilized for myriad tracking and monitoring applications. For example, the system 100 may be used to track children throughout a neighborhood via a tag 108 secured to an object of the child (e.g., a wearable device, backpack, bicycle, scooter, wheeled-board, sporting good, and/or other object) and, for example, notify the parents/guardians of a child's location periodically and/or in response to a particular condition (e.g., change in location). Similarly, in various embodiments, the system 100 and hardware tags 108 may be used for tracking students throughout a campus (e.g., notifying an administrator if a student is not where she is supposed to be, accounting for students in an emergency, etc.), tracking bikes (or other assets) in bike-share (or other asset-share) communities, tracking visitors at national parks and amusement parks, tracking transportation vehicles (e.g., with hazardous or otherwise important payloads), tracking emergency response vehicles, tracking individuals with special needs or at risk of elopement (e.g., elderly or diminished capacity), and/or performing other types of tracking and monitoring.

Although a wide array of applications of the system 100 and the hardware tags 108 have been described herein, it should be appreciated that the system 100 is not so limited to the applications specifically identified.

What is claimed is:

1. A method, comprising:
    determining, by a server, a location of a door in an architectural drawing and a room function of a room secured by the door based on an analysis of the architectural drawing;
    determining, by the server, proper access control hardware to be installed on the door based on the room function, a category of access control hardware, and a predictive machine learning model associated with the category of access control hardware; and
    generating, by the server, a specification based on the determined proper access control hardware.

2. The method of claim 1, wherein determining the location of the door and the room function comprises applying a plurality of morphological functions to the architectural drawing.

3. The method of claim 2, wherein determining the location of the door and the room function comprises applying a Houghlines function to determine line endpoints of a line in the architectural drawing.

4. The method of claim 1, wherein determining the location of the door and the room function comprises:
    performing binary thresholding to the architectural drawing to generate a binary image; and applying a plurality of morphological functions to the binary image.

5. The method of claim 1, further comprising determining, by the server, locations at which to position a plurality of gateway devices based on an analysis of the architectural drawing.

6. The method of claim 1, wherein the category of access control hardware is selected from a Door Hardware Institute (DHI) category of door hardware.

7. The method of claim 1, further comprising monitoring a location of the determined proper access control hardware using a hardware tag secured to the proper access control hardware subsequent to acquisition of the proper access control hardware.

8. The method of claim 7, wherein monitoring the location of the determined proper access control hardware comprises monitoring the location of the determined proper access control hardware via a base station when the determined proper access control hardware is between fifteen and twenty-five kilometers in distance from the base station.

9. A system, comprising:
at least one processor; and
at least one memory comprising a plurality of instructions stored thereon that, in response to execution by the at least one processor, causes the system to:
determine a location of a door in an architectural drawing and a room function of a room secured by the door based on an analysis of the architectural drawing;
determine proper access control hardware to be installed on the door based on the room function, a category of access control hardware, and a predictive machine learning model associated with the category of access control hardware; and
generate a specification based on the determined proper access control hardware.

10. The system of claim 9, wherein to determine the location of the door and the room function comprises to:
perform binary thresholding to the architectural drawing to generate a binary image; and
apply a plurality of morphological functions to the binary image.

11. The system of claim 9, wherein the plurality of instructions further causes the system to determine one or more locations at which to position one or more gateway devices based on an analysis of the architectural drawing.

12. The system of claim 9, wherein the category of access control hardware is selected from a Door Hardware Institute (DHI) category of door hardware.

13. The system of claim 9, wherein the plurality of instructions further causes the system to monitor a location of the determined proper access control hardware using a hardware tag secured to the proper access control hardware subsequent to acquisition of the proper access control hardware.

14. The system of claim 13, further comprising a base station; and
wherein to monitor the location of the determined proper access control hardware comprises to monitor the location of the determined proper access control hardware via the base station using communication signals of a first frequency band when the determined proper access control hardware is between fifteen and twenty-five kilometers in distance from the base station.

15. At least one non-transitory machine-readable storage medium comprising a plurality of instructions stored thereon that, in response to execution by a system, causes the system to:
determine a location of a door in an architectural drawing and a room function of a room secured by the door based on an analysis of the architectural drawing;
determine proper access control hardware to be installed on the door based on the room function, a category of access control hardware, and a predictive machine learning model associated with the category of access control hardware; and
generate a specification based on the determined proper access control hardware.

16. The at least one non-transitory machine-readable storage medium of claim 15, wherein the category of access control hardware is selected from a Door Hardware Institute (DHI) category of door hardware.

17. The at least one non-transitory machine-readable storage medium of claim 15, wherein the plurality of instructions further causes the system to track a hardware tag secured to access control hardware using a distributed ledger.

18. The method of claim 1, wherein determining the location of the door and the room function comprises:
identifying, by the server, text in the architectural drawing;
determining, by the server, coordinates of the identified text in the architectural drawing;
positioning a bounding box at the coordinates of the identified text; and
applying a door classifier at least one of within or around the bounding box to determine whether the identified text is associated with a door.

19. The method of claim 1, wherein the architectural drawing comprises a flattened image.

20. The method of claim 3, wherein determining the location of the door and the room function comprises determining a text label of the architectural drawing associated with the room function based on the line endpoints resulting from applying the Houghlines function.

* * * * *